United States Patent [19]

Buhrer

[11] 4,211,758
[45] Jul. 8, 1980

[54] CERAMIC COMPOSITIONS AND ARTICLES PREPARED THEREFROM

[75] Inventor: Carl F. Buhrer, Framingham, Mass.

[73] Assignee: GTE Laboratories Incorporated, Waltham, Mass.

[21] Appl. No.: 973,332

[22] Filed: Dec. 26, 1978

[51] Int. Cl.² .................. C04B 35/50; C04B 35/44
[52] U.S. Cl. .................. 423/263; 106/73.2; 264/63; 264/66
[58] Field of Search .................. 423/263; 106/73.2; 264/63, 65, 66

[56] References Cited

U.S. PATENT DOCUMENTS

| | | | |
|---|---|---|---|
| 3,294,701 | 12/1966 | Vogel et al. | 423/263 |
| 3,420,780 | 1/1969 | Forrat et al. | 106/73.2 |
| 3,545,987 | 12/1970 | Anderson | 106/73.2 |
| 3,588,573 | 6/1971 | Chen et al. | 106/73.2 |
| 3,640,887 | 2/1972 | Anderson | 252/301.4 F |
| 3,719,550 | 3/1973 | Arendt | 106/39.5 |
| 3,764,643 | 10/1973 | Muta et al. | 106/39.5 |
| 3,785,992 | 1/1974 | Fay et al. | 423/263 |
| 4,098,612 | 7/1978 | Rhodes et al. | 106/73.2 |
| 4,115,134 | 9/1978 | Rhodes | 106/73.2 |

OTHER PUBLICATIONS

Berndt, U. et al., "New Interlanthanide Perovskite Compounds," J. of Solid State Chemistry, 13, No. 1-2, Feb. 1975, pp. 131-135.

Geller, S. et al., "Phase Transitions in Perovskitelike Compounds of the Rare Earths," Physical Review B, vol. 2, No. 4, Aug. 1970, pp. 1167-1172.

Plakhty, V. et al., "X-Ray Study of the Phase Transition and Lattice Vibrations of Lanthanum Aluminate," Phys. Stat. Sol. 29, 1968, pp. K81-K83.

Leonov, A. et al., "High Temperature Chemistry of Cerium in the Systems Cerium Oxides–$Al_2O_3$, $Cr_2O_3$, $Ga_2O_3$," Translated from Izvestiya Akademii Nauk, USSR, Neorganicheskie Materialy, vol. 2, No. 3, Mar. 1966, pp. 517-523.

Primary Examiner—O. R. Vertiz
Assistant Examiner—Mark Bell
Attorney, Agent, or Firm—William R. McClellan

[57] ABSTRACT

A transparent or translucent article of manufacture such as a discharge tube for a metal vapor arc lamp is formed from a high density ceramic composition having a perovskite structure and having the formula:

$$ABO_3$$

wherein A can be lanthanum, cerium, praseodymium or neodymium and B has a smaller ionic radius and can be aluminium, scandium, lutecium or the like.

11 Claims, No Drawings

CERAMIC COMPOSITIONS AND ARTICLES PREPARED THEREFROM

CROSS-REFERENCE TO RELATED APPLICATION

Applicant has filed a patent application, concurrently herewith, entitled "Vacuum Tight Assembly", Ser. No. 973,333, filed Dec. 26, 1978, directed to a vacuum-tight assembly comprising a ceramic member having a cavity and means for sealing said cavity from the atmosphere, said ceramic composition being substantially transparent to visible light, and consisting essentially of a compound having a perovskite structure having the formula: $ABO_3$, wherein A is selected from the group consisting of lanthanum, cerium, praseodymium, neodymium and mixtures thereof and B is selected from the group consisting of aluminum, scandium, lutecium, and mixtures thereof, said means for sealing comprising at least one member formed from vanadium or a vanadium alloy containing up to about 4 weight percent zirconium and a brazing alloy, said member and brazing alloy having thermal coefficients of expansion closely matched to the thermal coefficient of expansion of said ceramic composition over a wide temperature range.

BACKGROUND OF THE INVENTION

This invention relates to transparent or translucent ceramic compositions and more particularly to ceramic compositions useful for forming metal vapor arc lamp discharge tubes.

Ceramic compositions are used widely in high temperature environments where good chemical and mechanical stability are required. However, the great majority of ceramic compositions are opaque to visible light and therefore cannot be used in a high temperature environment where a transparent window, lamp envelope or the like are required. For example, high pressure sodium lamps are now widely used because they have a higher light-output efficiency as compared to incandescent lamps generally, and they have an efficiency second only to the low pressure sodium lamp. The discharge tubes for the sodium metal vapor arc lamps are constructed from a polycrystalline alumina ceramic or from single crystal sapphire. Inside the presently utilized alumina or sapphire discharge tubes, an amalgam of sodium and mercury metals and some inert gas such as xenon are utilized to generate light. Surrounding the arc tube is an evacuated outer lamp envelope made of glass. A minimum temperature of several hundred degrees is required to vaporize the sodium and is obtained from the light emitting electric arc that also heats the central section of the arc tube to about 1200° C. The material forming the arc tube, in addition to being transparent or trans-lucent, must also be stable for a considerable time period against reaction with the sodium and mercury components within the tube at its operating temperature.

While the polycrystalline alumina ceramics and single crystal sapphire have the requisite degree of transparency for use in such discharge tubes, their use is proven undesirable since they tend to dissociate and vaporize as aluminum metal from the outside of the arc tube, thereby darkening the inner surface of the glass envelope of the lamp. The rate at which this takes place determines the useful lamp life and depends both on the arc tube temperature and the oxygen pressure within the outer envelope. This limitation on lamp life can be overcome, therefore, by placing a lower limit on oxygen pressure or an upper limit on arc tube operating temperature. However, neither approach is completely desirable. In presently utilized arc lamps, a niobium seal is utilized to seal the sodium vapor within the arc tube. However, niobium is permeable to oxygen and any attempt to permit oxygen in the outer envelope eventually leads to sodium loss within the arc tube by oxidation to sodium aluminate. On the other hand, placing an upper limit on arc tube temperature results in an undesirable reduction of light-output efficiency.

Accordingly, it would be highly desirable to provide ceramic compositions which are transparent or translucent to visible light, and which are more stable than pure alumina under the high temperature operating conditions of sodium vapor arc lamps.

SUMMARY OF THE INVENTION

This invention is based upon the discovery that high density ceramic compositions having a perovskite structure can be formed into mechanically stable articles of manufacture such as a flat window or a tubular structure or the like. The articles so formed are translucent or transparent to visible light and are not reduced by vaporous sodium to any significant extent. Accordingly, the compositions of this invention are particularly useful for forming a discharge tube for a sodium vapor arc lamp. That is, the compositions of this invention can be utilized in such a lamp without the need for increasing oxygen concentration within the envelope or for decreasing the temperature at which the lamp operates. Accordingly, the compositions of this invention can be utilized to form arc lamps which can operate at peak efficiency for far longer periods than presently available sodium vapor arc lamps.

DESCRIPTION OF SPECIFIC EMBODIMENTS

The compositions utilized in this invention comprise sintered, densified metallic oxides having the formula;

$$ABO_3$$

which compositions have a perovskite structure having a primitive unit cell dimension of about 4 angstroms. The A ion is located on the cell corner while the B ion, of smaller ionic radius is located at the cell center surrounded by 6 oxide ions at the cell face centers. Suitable A ions in accordance with this invention are the rare earth elements, lanthanum, cerium, praseodymium, neodymium or mixtures thereof. The B ions have a smaller ionic radius than the A ions, generally within the range of between about 0.5 Å and about 0.9 Å. Representative suitable B ions include aluminum, scandium, lutecium or mixtures thereof. All of the compounds useful herein either are cubic perovskites or perovskites of lower symmetry, some of which undergo second order phase transitions as their temperature increases so that as the temperature increases, their structure approaches or reaches a cubic structure.

Among the perovskite compounds falling within the above definition which are useful herein are: $LaAlO_3$, $CeAlO_3$, $LaScO_3$, $CeScO_3$, $LaLuO_3$, $PrAlO_3$, $NdAlO_3$, or the like. While some of the compounds falling within the scope of the above formula are known including $LaAlO_3$, $CeAlO_3$, $PrAlO_3$ and $NdAlO_3$, none of these compounds have been processed to form high density articles of manufacture which would be useful in a high temperature environment such as in an arc lamp discharge tube. Each of the aluminate compounds utilized in the present invention has a melting point approximating that of alumina, but has a lower dissociation pressure of aluminum and oxygen than does pure alumina because of the additional stability imparted by the free energy of compound formation from the component oxides. The preferred compounds utilized in the present invention are $LaAlO_3$ and $CeAlO_3$ since both the lanthanum and cerium rare earths have no appreciable optical absorption in the visible region of the spectrum where the high pressure sodium lamp emits light and because the compounds have ideal cubic symmetry above about 525° C. and 960° C. respectively which results in a lower light scattering component at the operating temperature due to crystallite birefringence relative to hexagonal alumina in polycrystalline form. Also desirable, but less preferred, compounds are the non-aluminate compounds containing instead scandium or lutecium. These compounds retain slightly non-cubic symmetry at the operating temperature of sodium vapor lamp arc tube and therefore do not reach the degree of translucency possible with a cubic material. However, these non-aluminate compositions retain a sufficient degree of translucency which render them useful as arc discharge lamps. The non-aluminates have the advantage of eliminating the possibility of aluminum evaporation during arc lamp operation as they are aluminum free. Other modes of material degradation are unlikely in view of the higher thermodynamic stability of the component oxides in these compounds.

The compounds of this invention are usually prepared by reaction of their component simple oxides in a non-reactive e.g. an oxygen-containing atmosphere or, in the case of cerium compounds in an atmosphere such as hydrogen which functions to reduce tetravalent cerium in the $CeO_2$ starting compound to the trivalent state. Since the oxides generally are quite refractory by nature, temperatures of about 1300° C. are required. Material prepared in this manner is usually coarsely crystalline and unsatisfactory for sintering to high densities since the ultimate goal of this invention is to produce ceramics of near theoretical density. A most important material characteristic is the particle size of the powder being densified, and this factor greatly influences the mode of compound formation that must be used to make the powder. Not only must the powder have particle sizes in the few tenths of a micron range, but this powder must be essentially single phase and quite free of unreacted component oxides. If it is not, then there exists the possibility of $H_2O$ or $O_2$ evolution during sintering which will inhibit the total collapse of closed pores.

In the preferred method for forming the compositions of this invention, coprecipitation of the A and B ions is effected from a salt solution of a branched chain organic acid having from six to ten carbon atoms such as the ammonium or other soluble salts of 3, 5, 5-trimethyl hexanoic acid, 2-ethyl hexanoic acid, or the like. It has been found that the precipitates obtained with such salt solutions yield a coprecipitated salt mixture that does not recrystallize readily so that the metallic elements remain initimately mixed. These precipitates can be filtered readily and dried such as in air. The conversion of the coprecipitated mixture to a mixture of metal oxides, and ultimately to the desired mixed oxide having the perovskite structure is achieved by controlled thermodecomposition and air oxidation of the precipitate to remove all organic components and free carbon. The metallic salt precipitates from the branched chain organic acids decompose without melting as they are heated thereby forming a voluminous mass containing the oxides and carbon. In contrast, salt precipitates derived from unbranched carbon chain carboxylic acids such as n-octanoic acid or lauric acid melt and decompose while partially liquid and give ash agglomerated into relatively large flake particles.

The metal oxide and carbon mixture then is heated further in air at temperatures up to about 1000° C., usually about 800° C. to allow all the carbon to oxidize leaving a white mixture or, in the case of cerium, a pale yellow mixture including $CeO_2$. The mixture can contain the compounds of this invention, the oxide of the A ion and the oxide of the B ion. Further heat treatment of this mixture; usually at about 1,000° C. to about 1,100° C. then completes the reaction to the oxide compound used to form the shaped articles of this invention. As noted above, in the case of cerium compounds, this heating step is carried out in the presence of a reducing agent such as hydrogen which permits the simultaneous reduction and reaction to take place thereby forming the desired compound. Compounds prepared in this manner usually have a particle size within the 0.1 to 0.2 mircon range. This powdered product then can be treated such as by ball milling, air jet milling or the like to further reduce the average particle size thereof. Since the particle size of the product produced by the above-described coprecipitation procedure produces a product having a smaller average particle size than by other procedures for producing a product which is to be sintered, this coprecipitation procedure is preferred.

An alternative process for forming the oxide powdered mixtures involves the direct reaction of an oxide of an A ion and an oxide of the B ion in proper stoichiometric concentrations at a temperature generally in the range of about 1000° C. to 1500° C., usually between about 1300° C. and 1400° C. in a non-reactive, e.g. oxygen-containing atmosphere. The product obtained is relatively coarsely crystalline and requires generally extensive comminution such as by ball milling and/or air jet milling.

The fine particles having an average particle size of less than about 0.2 micron comprise fully reacted perovskite compounds and serve as the starting material for the sintering step utilized to form translucent ceramics of near theoretical density. The particles are densified either in the presence of a small quantity of alumina in addition to that needed for stoichiometry as a densification aid or in the absence of a densification aid. When employed, the alumina utilized as a densification aid can be added before or after the initial coprecipitation step. It is preferred that it be added prior to the coprecipitation step in order to form a powder wherein the additional alumina is homogeneously dispersed. By way of example, in the case of lanthanum aluminate and cerium aluminate, the compositions to be sintered including the alumina as a densification aid have the formula:

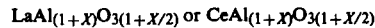

$$LaAl_{(1+X)}O_{3(1+X/2)} \text{ or } CeAl_{(1+X)}O_{3(1+X/2)}$$

where X is between 0 and 0.03. During the sintering process the excess alumina allows the formation of a second crystallographic phase of composition $LaAl_{11}O_{18}$ or $CeAl_{11}O_{18}$. This may be seen by formulating the original composition as $(1-X/10)(LaAlO_3)\cdot(X/10)(LaAl_{11}O_{18})$ or $(1-X/10)(CeAlO_3)\cdot(X/10)(CeAl_{11}O_{18})$ The aluminate powder with the aluminum composition so modified with X values of up to 0.03 is obtained from the processing step in which the reaction of the component oxides is completed by heating in air in the case of $LaAlO_3$ or hydrogen in the case of $CeAlO_3$. The powder then is subjected to a deagllomeration processing step such as by being milled in an air jet stream.

The first step in forming the translucent ceramic from the powder is to compress the fine powder in a mold of desired shape. Typically, to improve the green strength of the pressed piece, a 1% water solution of polyvinylalcohol (PVA) can be added to the powder which is then dried and sieved through a fine mesh. Complex shapes such as an arc tube needed for high pressure sodium lamp construction can be isostatically pressed in suitable mold such as a rubber bag mold having a stainless steel core insert that forms the inner hole of the tube. Pressures of approximately 30,000 pounds per square inch are satisfactory. The so-called green densities at this stage are in the range of 45% to 58% of the theoretical density of the solid (6.522 gm/cm³ for $LaAlO_3$, 6.644 gm/cm³ for $CeAlO_3$). After pressing, the piece is prefired at a temperature of about 1200° C. to remove any residual moisture and PVA, if present $LaAlO_3$ is processed usually in air, while $CeAlO_3$ is processed in hydrogen to avoid oxidative decomposition of the material.

The sinterings of the prefired pieces are conducted in conventional apparatus such as in a hydrogen atmosphere furnace wherein tungsten heating elements and molybdenum heat shields operated in hydrogen are used to achieve temperatures in the order of 2,000° C. A two cycle sintering process gives excellent results in achieving theoretical density. It is believed that the improvement is based upon the behavior of the perovskite compounds in the presence of the slight excess of alumina in their formulation. As shown above, the excess alumina corresponds to a small mole fraction of a second phase $LaAl_{11}O_{18}$ or $CeAl_{11}O_{18}$. These compounds, with the corresponding perovskite compounds $LaAlO_3$ and $CeAlO_3$, form a liquid of eutectic composition at a temperature considerably lower than the melting point of the pure perovskite primary phase. For example, in the case of $CeAlO_3$ this eutectic liquid appears at approximately 1,775° C. The first sintering cycle is carried out below this temperature where the second minor phase exists as minute solid particles that appear as the powder begins to recrystallize. They retard the grain growth of the $CeAlO_3$ primary phase by pinning the grain boundaries between crystallites. As this first sintering cycle proceeds at temperatures below the eutectic melt temperature, the pore volume decreases while grain growth is retarded. This retardation is desirable to avoid entrapment of pores within crystallite grains because, once so-trapped, grains can no longer be expelled from the ceramic structure. A satisfactory temperature cycle for this sintering phase in $CeAlO_3$ is about 1,600° C. to 1,650° C. for about four to five hours in the hydrogen atmosphere.

The second sintering cycle is carried out above the eutectic temperature where the $CeAl_{11}O_{18}$ solid phase vanishes and a liquid of eutectic composition is present. This liquid appears between grains of $CeAlO_3$ and serves as a recrystallization medium that allows the grain boundary to move in a direction which tends to increase the average cystallite size. As it moves it serves to collect most of the residual pores left after the first sintering cycle. A satisfactory temperature cycle for this sintering phase in $CeAlO_3$ at 1,850° C. for about one to five hours.

The products obtained in accordance with the present invention have a density of at least about 95% theoretical density and preferably more than about 99% theoretical density. The products obtained are transparent or sufficiently translucent to visible light as to permit their use as metal vapor arc discharge tubes.

The following examples illustrate the present invention and are not intended to limit the same.

EXAMPLE I

This example illustrates the preparation of the representative starting materials, lanthanum aluminate and cerium aluminate used to form the products of this invention. In this procedure, a nitrate solution of the mixed cations of either lanthanum and aluminum or cerium and aluminum is coprecipitated as the 2-ethylhexanoate salts and dried. The dry solid is burned in air to the oxide mixture of either $CeO_2+Al_2O_3$ or $La_2O_3+Al_2O_3$. Reaction in air in the case of lanthanum or reductive reaction in hydrogen in the case of cerium is then used to effect the conversion to $LaAlO_3$ or $CeAlO_3$.

A convenient quantity of material for testing is that containing 1/6 mole of $CeAlO_3$ or $LaAlO_3$. Allowing for losses in handling, about 30 g of powder can be obtained. Solutions of the rare earth nitrate are prepared from lanthanum oxide or cerous carbonate by dissolution in dilute nitric acid. Aluminum nitrate solution is prepared from the solid and water. Both solutions are filtered and assayed for their rare earth oxide content. Appropriate quantities of solution corresponding to the desired amount of the composition to be formulated are measured and combined. The resultant mixture is stirred for several minutes to ensure thorough mixing. As much as possible of any excess nitric acid then is neutralized by adding ammonium hydroxide and stirring until any transient precipitate redissolves. The solution then is diluted to a concentration of ⅔ moles per liter.

The precipitation of the 2-ethyl hexanoate salts of Ce and Al or La and Al requires about three moles of acid for each mole of Ce and only about two moles of acid for each mole of Al since the salts of these organic acids are hydroxy salts. To allow for some excess precipitant, between about 5/6 and 1 mole of 2-ethyl hexanoic acid as the ammonium salt is used for the precipitation of 1/6 mole of $CeAlO_3$ or $LaAlO_3$.

The 2-ethyl hexanoic acid is filtered or preferably distilled before use to remove impurities. To about 1 to 1.2 liters of deionized water are added 132 g of this acid and enough ammonium hydroxide reagent to dissolve the oily acid and bring the pH to 9 (60 ml to 75 ml). To this cloudy solution then is added slowly with stirring 250 ml of the mixed metal nitrate solution containing 1/6 mole $CeAlO_3$ or $LaAlO_3$. During the precipitation the pH should be kept at about 9 by the addition of dilute ammonia. After the last of the nitrate is added, the precipitate is filtered and washed once with an equal volume of water containing enough $NH_3$ to make the pH equal to 9. The white precipitate is oven-dried for two days at 80° C.

The pH control during the precipitation appears to be important. At higher pH, a significant amount of the Ce or La precipitates as the hydroxides as evidenced in the case of Ce by the susceptibility of the precipitate to air oxidation to a brown color. At lower pH and particularly if the nitrate solution is very acidic, the initial precipitate contains free 2-ethyl hexanoic acid and the metal added later has insufficient precipitant. The oxides formed from such products do not as readily react to give $CeAlO_3$ or $LaAlO_3$.

The decomposition of the organic salt precipitate to the oxides is done in a quartz boat in a horizontal tube furnace. An air flow enters one end of the furnace tube, and the other end is left wide open to avoid explosions. The salt at the inlet end is ignited with a flame and continues to burn or smolder as the boat is pushed into the furnace tube from the open end. The air flow aids the combustion which proceeds along the boat in a few hours. When the entire contents appear charred and incapable of sustaining further combustion without additional heat, the furnace is turned on and raised to about 700° to 800° C. After one to two hours the powder ash is free of black carbon.

The mixture of oxides is then further heated to 1,000° C. to 1100° C. in a stream of air in the case of $LaAlO_3$ or hydrogen in the case of $CeAlO_3$ preparation. After about three hours the product is converted to the perovskite phase product essentially free of the individual component oxides. In this procedure it appears preferable to leave the oxide undisturbed before reaction so that the porous structure of the material can aid in minimizing agglomeration of the powder during the further heating. Then the product is hand-ground and sieved through 50 mesh cloth after which it can be air jet milled and stored for sintering experiments.

EXAMPLE II

This example illustrates the preparation of densified sintered products with the $CeAlO_3$ compositions of Example I when admixed with a densification additive comprising $CeAl_{11}O_{18}$.

Powders of various compositions, but all based on $CeAlO_3$, were mixed after jet milling with a 1% water solution of polyvinyl alcohol (PVA) to form a slurry which was then dried and sieved through a fine nylon mesh. Disk samples were pressed in a ½-in. diameter die to a thickness of about 1/16 in. A low pressure of about 5000 lb/in.² was used. Each was then wrapped in plastic film, put in a rubber bag and isostatically pressed at about 30,000 lb/in.². The so-called green densities at this stage varied from 45% to 58% of theoretical (6.644 gm/cm³ for $CeAlO_3$). A prefiring in $H_2$ to 1,000° to 1,200° C. was done to remove the organic binder. Sinterings were carried out in a Centorr furnace in which tungsten elements and molybdenum heat shields operated in hydrogen are used to achieve temperatures of 2,000° C. and higher.

The sintering studies were made on $CeAlO_3$. Sintering runs were made on the pure compound, that is, a preparation in which the Ce to Al atomic ratio is as close to unity as can be achieved by accurate assaying of the stock solutions and on $CeAlO_3$ with various additions. The technique of air jet milling was introduced which greatly aided the densification process by reducing the powder particle size.

The principal system under investigation was:

$$CeAl_{(1+X)}O_{3(1+X/2)} \text{ (or) } (1-X/10)CeAlO_3 \cdot X/10\ CeAl_{11}O_{18}$$

with X = 0.01, 0.03

As applied to the compositions, a first cycle was done at 1,600° and 1,650° C. for four and five hours, respectively, and a second cycle was at 1,850° C. for five hours. Samples with X equal 0, 0.01 and 0.03 reached 96.4%, 97.4% and 99.4% of theoretical density, respectively.

I claim:

1. An article of manufacture comprising a high density polycrystalline body substantially transparent to visible light, said body consisting essentially of a compound having a perovskite structure and the formula:

$$ABO_3$$

wherein A is selected from the group consisting of lanthanum, cerium, praseodymium, neodymium and mixture thereof and B is selected from the group consisting of aluminum, scandium, lutecium and mixture thereof.

2. The article of manufacture of claim 1, wherein B is aluminium.

3. The article of manufacture of claim 1, wherein A is lanthanum.

4. The article of manufacture of claim 2, wherein A is lanthanum.

5. The article of manufacture of claim 1, where A is cerium.

6. The article of manufacture of claim 2, where A is cerium.

7. The article of manufacture of claim 1, wherein said polycrystalline body is sufficiently transparent to be used as an arc discharge tube.

8. The article of manufacture of claim 7, wherein said polycrystalline body has a density of at least about 95% theoretical density.

9. The article of manufacture of claim 8, wherein A is cerium and B is aluminum.

10. The article of manufacture of claim 8, wherein A is lanthanum and B is aluminum.

11. The article of manufacture of claim 1, wherein said polycrystalline body is formed into a hollow cylindrical tube suitable for use as an arc discharge tube.

* * * * *